US009674572B2

(12) United States Patent
Narahara et al.

(10) Patent No.: US 9,674,572 B2
(45) Date of Patent: Jun. 6, 2017

(54) INFORMATION PROCESSING SYSTEM, METHOD, AND PROGRAMMING FOR CATEGORIZING BROADCAST PROGRAM INFORMATION

(75) Inventors: Tatsuya Narahara, Kanagawa (JP); Kazuhiro Watanabe, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 567 days.

(21) Appl. No.: 13/453,072

(22) Filed: Apr. 23, 2012

(65) Prior Publication Data

US 2012/0210361 A1 Aug. 16, 2012

Related U.S. Application Data

(63) Continuation of application No. 11/894,293, filed on Aug. 21, 2007, now abandoned.

(30) Foreign Application Priority Data

Aug. 23, 2006 (JP) ................................. 2006-226017

(51) Int. Cl.
*H04N 5/445* (2011.01)
*G06F 3/00* (2006.01)
(Continued)

(52) U.S. Cl.
CPC ....... *H04N 21/434* (2013.01); *H04N 5/44543* (2013.01); *H04N 5/50* (2013.01); *H04N 7/163* (2013.01); *H04N 21/4345* (2013.01); *H04N 21/44222* (2013.01); *H04N 21/4532* (2013.01); *H04N 21/466* (2013.01); *H04N 21/482* (2013.01); *H04N 21/8405* (2013.01);
(Continued)

(58) Field of Classification Search
CPC .......... H04N 21/4755; G06F 17/30598; G06F 17/30713
See application file for complete search history.

(56) References Cited

U.S. PATENT DOCUMENTS 7,421,725 B2 * 9/2008 Hane et al. ...................... 725/46
2003/0043185 A1 * 3/2003 Kake et al. .................. 345/738
(Continued)

FOREIGN PATENT DOCUMENTS

EP          1063797 A2 * 12/2000
JP       2001-045391        8/2002
(Continued)

OTHER PUBLICATIONS

Notice of Reasons for Rejection-1, English translation.
(Continued)

*Primary Examiner* — James R Marandi
(74) *Attorney, Agent, or Firm* — Haug Partners LLP; William S. Frommer; Xuezheng Wang

(57) ABSTRACT

An information processing device includes an extraction section for extracting, from program information, a genre feature word that is a keyword representing a genre feature. An identification section identifies a channel by genre based on the genre feature word extracted from the program information associated with a program to be broadcast on the channel. The processing device further includes a display processing section for providing control over the channel to be displayed after genre classification.

11 Claims, 16 Drawing Sheets

(51) Int. Cl.

| | |
|---|---|
| *G06F 17/30* | (2006.01) |
| *H04N 21/434* | (2011.01) |
| *H04N 5/50* | (2006.01) |
| *H04N 7/16* | (2011.01) |
| *H04N 21/442* | (2011.01) |
| *H04N 21/45* | (2011.01) |
| *H04N 21/466* | (2011.01) |
| *H04N 21/482* | (2011.01) |
| *H04N 21/8405* | (2011.01) |
| *H04N 21/475* | (2011.01) |

(52) U.S. Cl.
CPC .. *G06F 17/30598* (2013.01); *G06F 17/30713* (2013.01); *H04N 21/4755* (2013.01)

(56) References Cited

U.S. PATENT DOCUMENTS

| | | | |
|---|---|---|---|
| 2005/0120371 A1* | 6/2005 | Kimura et al. | 725/46 |
| 2005/0160453 A1* | 7/2005 | Kim | 725/39 |
| 2007/0136754 A1* | 6/2007 | Kimura et al. | 725/46 |

FOREIGN PATENT DOCUMENTS

| | | | |
|---|---|---|---|
| JP | 2002-094893 | | 10/2003 |
| JP | 2004200757 A | * | 7/2004 |
| JP | 2004-200757 | | 5/2005 |
| JP | 2005-051493 | | 5/2006 |
| JP | 10-2006-0063931 | | 12/2006 |
| JP | 2006-180306 | | 2/2007 |
| JP | 2006-060284 | | 9/2007 |
| JP | 2006-226017 | | 3/2008 |
| JP | 2010-136276 | | 1/2012 |
| JP | 2010-294904 | | 7/2012 |
| WO | WO 2005/015902 | | 2/2005 |
| WO | WO 2007/013308 | | 2/2007 |

OTHER PUBLICATIONS

Notice of Reasons for Rejection-2, English translation.
Chinese First Office Action, dated Jun. 6, 2008.
Chinese Second Office Action, dated Nov. 14, 2008.
Chinese Rejection Decision, dated Mar. 13, 2009.
Chinese Third Office Action, dated Jan. 8,2010.
Chinese Rejection Decision, dated May 27, 2010.
Korean IPO Notice of Preliminary Rejection, dated Aug. 30, 2013.
Korean IPO Notice of Preliminary Rejection, dated Feb. 28, 2014.
Korean Notice of Allowance, dated Jul. 29, 2014.
Japanese Notice of Grant.
Japanese Notice of Refusal.
Japanese Interlocutory Examination, dated Jun. 29, 2006.
Japanese Reexamination Decision, dated Nov. 24, 2010.
Japanese Reexamination Decision, dated Oct. 9, 2011.
Japanese Reexamination Decision, dated Dec. 14, 2011.
Chinese Reexamination Decision, dated Aug. 18, 2009.

* cited by examiner

FIG. 4

| ID | CHANNEL NAME | PROGRAM TITLE | PROGRAM DESCRIPTION |
|---|---|---|---|
| A1 | CMNj | WORLD BUSINESS (CMN/Int'l) | LATEST NEWS WITH MARKET TRENDS FROM LONDON, THE CENTER OF WORLD ECONOMY |
| A2 | CMNj | LOU DOUBLE TODAY (CMN/US) | GENERAL-INTEREST BUSINESS NEWS PROGRAM BY LOU DOUBLE, THE EXPERIENCED NEWS ANCHOR OF CMN – BUSINESS INFORMATION IN ENTERTAINMENT AND SPORTS INDUSTRIES |
| A3 | CMNj | SPORTS INTERNATIONAL (CMN/Int'l) | WORLDWIDE SPORTS NEWS PROGRAM WITH ALL-OUT EFFORT OF CMN SPORTS CREW – LONG VALUABLE INTERVIEW OF INFLUENTIALS IN VARIOUS FIELDS, AND GOOD PLAYS DURING GAMES AT ANY TIME |
| A4 | CMNj | PAULA ZABON SHOW (CMN/US) | NEWS SHOW BY PAULA ZABON, MAIN FEMALE ANCHOR OF CMN/U.S., GETTING TO THE CORE OF PROBLEMS – IN-DEPTH NEWS WITH INTERVIEWS AND SCOOP OF CMN |
| A5 | CMNj | CMN NOW (CMN/Int'l) | NEWS-ORIENTED VARIETY SHOW BY CMN INTERNATIONAL – REAL-TIME LATEST TOPICS OF POLITICS, ECONOMY, SPORTS, WEATHER, AND MORE |

FIG. 5

| ID | CHANNEL NAME | PROGRAM TITLE | PROGRAM DESCRIPTION |
|---|---|---|---|
| B1 | ESRN | Touchin' you, Ronda, SUMO WRESTLING - TOCHITSUKA | SPORTS HUMAN DOCUMENTARY - "Touchin' you, Ronda" SUMO WRESTLING: TOCHITSUKA |
| B2 | ESRN | *CHEERLEADING CHAMPIONSHIP 2006 IN USA | = CHEERLEADING CHAMPIONSHIP 2006 IN US = REPORT OF CHAMPIONSHIP IN ORLANDO, FLORIDA, USA - MECCA FOR CHEERLEADING |
| B3 | ESRN | NEWS SPORTS USA (06/17) | [NEWS SPORTS USA] POPULAR PROGRAM OF ESRN - USA NO. 1 SPORTS-DEDICATED CHANNEL – EVERY-DAY PROGRAM OF LATEST SPORTS NEWS FROM USA |
| B4 | ESRN | HANK HAINEY'S GOLF LESSON | "HANK HAINEY'S GOLD LESSON" – 5-MINUTE GOLF LESSON BY HANK HAINEY, COACH OF TIGER WOOD AND DAVID DURAN |
| B5 | ESRN | WHEEL CLUB #21 | INFORMATION PROGRAM FOR ENTHUSIASTS OF VEHICLES - ANY VEHICLES WITH WHEELS INCLUDING CARS, BIKES, AND MORE! |

FIG. 6

| ID | FROM CHANNEL NAME | FROM PROGRAM TITLE | FROM PROGRAM DESCRIPTION |
|---|---|---|---|
| A2 | CMNj | LOU DOUBLE | CMN |
| A2 | | TODAY | EXPERIENCED |
| A2 | | CMN | ANCHOR |
| A2 | | US | LOU DOBBS |
| A2 | | | GENERAL-INTEREST |
| A2 | | | BUSINESS |
| A2 | | | NEWS |
| A2 | | | PROGRAM |
| A2 | | | ENTERTAINMENT |
| A2 | | | INDUSTRY |
| A2 | | | SPORTS |
| A2 | | | FIELD |
| A2 | | | BUSINESS |
| A2 | | | INFORMATION |

| NEWS FEATURE WORD | SPORTS FEATURE WORD |
|---|---|
| BUSINESS | SPORTS |
| ECONOMY | GAME |
| NEWS | GOOD PLAY |
| ANCHOR | SUMO WRESTLING |
| REPORT CREW | CHEERLEADING |
| SCOOP | CHAMPIONSHIP |
| POLITICS | COMPETITION |
| TERRORISM | GOLF |
| WEATHER | COACH |
| TOPICS | SOCCER |
| REPORTS | TABLE TENNIS |
| INCIDENT | BILLIARDS |
| ⋮ | ⋮ |

FIG. 8

| ID | NEWS FEATURE WORD | SPORTS FEATURE WORD |
|---|---|---|
| A1 | 3 | 0 |
| A2 | 4 | 1 |
| A3 | 4 | 5 |
| A4 | 3 | 0 |
| A5 | 5 | 1 |

FIG. 9

| ID | NEWS FEATURE WORD | SPORTS FEATURE WORD |
|---|---|---|
| B1 | 0 | 3 |
| B2 | 0 | 6 |
| B3 | 3 | 4 |
| B4 | 0 | 4 |
| B5 | 0 | 0 |

FIG. 10

| CHANNEL | NEWS FEATURE WORD | SPORTS FEATURE WORD |
|---|---|---|
| A | 19 | 6 |

FIG. 11

| CHANNEL | NEWS FEATURE WORD | SPORTS FEATURE WORD |
|---|---|---|
| B | 3 | 17 |

| CHANNEL | CATEGORY | FAVORITE |
|---|---|---|
| A | NEWS | |
| B | SPORTS | |

FIG. 14

| ID | NEWS | SPORTS |
|---|---|---|
| A1 | TRUE | FALSE |
| A2 | TRUE | FALSE |
| A3 | FALSE | FALSE |
| A4 | TRUE | FALSE |
| A5 | TRUE | FALSE |

FIG. 15

| ID | NEWS | SPORTS |
|---|---|---|
| B1 | FALSE | TRUE |
| B2 | FALSE | TRUE |
| B3 | FALSE | TRUE |
| B4 | FALSE | TRUE |
| B5 | FALSE | FALSE |

FIG. 16

| CHANNEL | NEWS PROGRAM | SPORTS PROGRAM |
|---|---|---|
| A | 4 | 1 |

FIG. 17

| CHANNEL | NEWS PROGRAM | SPORTS PROGRAM |
|---|---|---|
| B | 0 | 4 |

| CHANNEL | CATEGORY | FAVORITE |
|---|---|---|
| A | NEWS | |
| B | SPORTS | |

| CHANNEL | ID | CATEGORY | FAVORITE |
|---|---|---|---|
| A | A1 | NEWS | |
| | A2 | NEWS | |
| | A3 | SPORTS | |
| | A4 | NEWS | |
| | A5 | NEWS | |
| B | B1 | SPORTS | |
| | B2 | SPORTS | |
| | B3 | SPORTS | |
| | B4 | SPORTS | |
| | B5 | OTHERS | |

206

INFORMATION PROCESSING SYSTEM, METHOD, AND PROGRAMMING FOR CATEGORIZING BROADCAST PROGRAM INFORMATION

CROSS REFERENCES TO RELATED APPLICATIONS

This is a continuation of application Ser. No. 11/894,293, filed Aug. 21, 2007 now abandoned, which is entitled to a claim of priority of Japanese Application 2006-226017, filed Aug. 23, 2006; the entirety of which is incorporated herein by reference.

BACKGROUND OF THE INVENTION

1. Field of the Invention

The present invention relates to information processing device, method, and program and, more specifically, to information processing device, method, and program that enables easy search of any desired channel.

2. Description of Related Art

With the recent diversification of television broadcasting systems, the number of channels available for viewing has been increased. Such an increase of the number of channels indeed provides a user a wide choice of programs, however, there is also a difficulty in finding his or her desired channel through frequent channel change, i.e., zapping, or through the use of EPG (Electronic Program Guide).

As a solution of such a difficulty, there is a technology of displaying a list of channels that are often tuned. The channels are those entered after being classified into categories that are previously provided, and the channels displayed in the list for any user-selected category are size-reduced videos or displayed by name. As an example, refer to Patent Document 1 (JP-A-10-136276).

There is another technology of classifying channels into three hierarchies of category, i.e., first to third levels, based on category information overlaid on program information. The hierarchies of category are changed with varying speed for channel tuning in response to the operation of a jog-shuttle of a remote controller, and videos of channels found in any selected category are selected and displayed through sequential channel tuning. As an example, refer to Patent Document 2 (JP-A-2001-45391).

SUMMARY OF THE INVENTION

The problem with the technology of Patent Document 1 is that a user is required to enter channels after classification of channels according to categories in advance. Such classification of channels is completely left for a user, and thus the classification result is not always appropriate. If the classification result turns out not to be appropriate, this may instead increase the difficulty in finding any desired channel.

The problem with the technology of Patent Document 2 is that a user is required to actually view the videos to find his or her desired category, thereby instead taking long time to complete channel search. Another problem is a user difficulty in understanding to which category in which hierarchy the currently-displayed video of a channel belongs, and understanding whether his or her desired channel is belonging to the category that is currently selected. Therefore, if a user's desired channel is not found in the currently-selected category, finding the channel will result in another difficulty.

It is thus desirable to enable search of any desired channel with ease.

According to a first embodiment of the present invention, there is provided an information processing device, including: extraction means for extracting, from program information, a category feature word being a keyword representing a category feature; identification means for identifying a channel by category based on the category feature word extracted from the program information for a program to be broadcast on the channel; and display control means for exercising control over the channel to be displayed after category classification.

The identification means can identify the channel by category based on a counting result of the extracted category feature word for each of a plurality of categories.

The identification means can identify the program by category based on the category feature word extracted from the program information for the program, and based on the category of the program to be broadcast on the channel, identify the channel by category.

The identification means can identify the channel by category based on a counting result of the program to be broadcast on the channel for each of a plurality of categories.

The identification means can identify the channel by category based on a counting result of a broadcast time of the program to be broadcast on the channel for each of a plurality of categories.

The identification means can identify the channel by category on a basis of the program based on the extracted category feature word, and the display control means can exercise control over the channel to be displayed after classification of a program currently being on the air into any of the categories.

The display control means can display a category list, and exercise control over the channel to be displayed in a list for any one of a plurality of categories selected from the category list.

The information processing device may further include calculation means for calculating a user's degree of preference for the channel based on a history of an operation made to the program broadcast on the channel, and in the device, the display control means can exercise control over the channel, when the degree of preference is high, to be displayed as a channel belonging to a group different from a plurality of categories.

According to a second embodiment of the present invention, there is provided an information processing method or program, including the steps of: extracting, from program information, a category feature word being a keyword representing a category feature; identifying a channel by category based on the category feature word extracted from the program information for a program to be broadcast on the channel; and exercising control over the channel to be displayed after category classification.

In one embodiment of the invention, a category feature word being a keyword representing a category feature is extracted from program information, a channel is identified by category based on the category feature word extracted from the program information for a program to be broadcast on the channel, and control is exercised over the channel to be displayed after category classification.

According to an embodiment of the invention, channels are displayed. According to another embodiment of the invention, any desired channel can be searched and found with ease.

BRIEF DESCRIPTION OF THE DRAWINGS

FIG. 4 is a diagram showing exemplary program information;

FIG. 5 is a diagram showing another exemplary program information;

FIG. 6 is a diagram showing exemplary keywords extracted from the program information;

FIG. 7 is a diagram showing an exemplary feature word table;

FIG. 8 is a diagram showing an exemplary counting result of category feature words for each program;

FIG. 9 is a diagram showing another exemplary counting result of category feature words for each program;

FIG. 10 is a diagram showing an exemplary counting result of category feature words for each channel;

FIG. 11 is a diagram showing another exemplary counting result of category feature words for each channel;

FIG. 12 is a diagram showing an exemplary channel category table;

FIG. 14 is a diagram showing an exemplary result of category identification for each program;

FIG. 15 is a diagram showing another exemplary result of category identification for each program;

FIG. 16 is a diagram showing an exemplary result of category counting for programs on each channel;

FIG. 17 is a diagram showing another exemplary result of category counting for programs on each channel;

FIG. 18 is a diagram showing another exemplary channel category table;

DETAILED DESCRIPTION OF THE INVENTION

Figure 1:
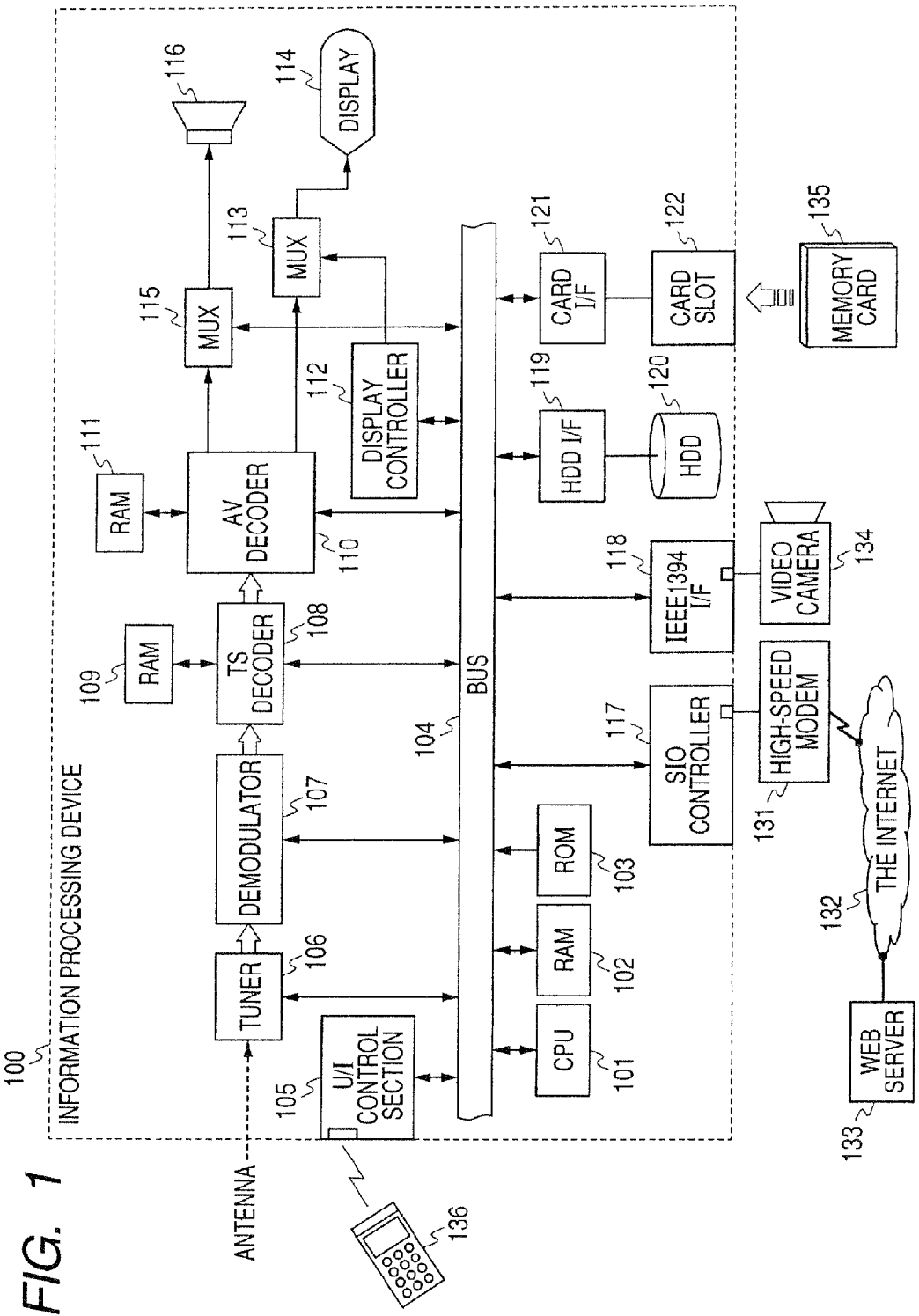
FIG. 1 is a block diagram showing the hardware configuration of an information processing device in an embodiment of the invention.

Prior to describing embodiments of the invention below, exemplified is a correlation among claimed components and embodiments in this specification or in the accompanying drawings. This is aimed to prove that embodiments provided for the purpose of supporting the description of claims are described in the specification or in the accompanying drawings. Therefore, even if there is any specific embodiment found in the specification or in the accompanying drawings but not found here for the components described in the embodiments of the invention, it does not mean that the embodiment is not correlated with the components. On the other hand, even if there is any specific embodiment found here for the components, it does not mean that the embodiment is only correlated with the components.

One embodiment of the invention is directed to an information processing device (e.g., information processing device 100 of FIG. 1) that firstly includes: extraction means (e.g., category feature word extraction section 203 of FIG. 2) for extracting, from program information, a category feature word being a keyword representing a category feature; identification means (e.g., category identification section 205 of FIG. 2) for identifying a channel by category based on the category feature word extracted from the program information for a program to be broadcast on the channel; and display control means (e.g., search screen display processing section 214 in FIG. 2) for exercising control over the channel to be displayed after category classification.

An embodiment of the invention is directed to an information processing device (e.g., information processing device 100 of FIG. 1) that secondly further includes calculation means (e.g., preference information processing section 212 of FIG. 2) for calculating a user's degree of preference for the channel based on a history of an operation made to the program broadcast on the channel, and in the device, the display control means exercises control over the channel, when the degree of preference is high, to be displayed as a channel belonging to a group different from a plurality of categories.

Figure 20:
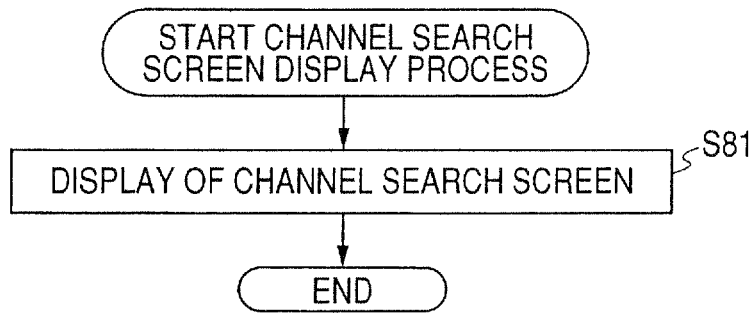
FIG. 20 is a flowchart of a process of channel search screen display to be executed by the information processing device in the first embodiment of the invention.
Figure 22:
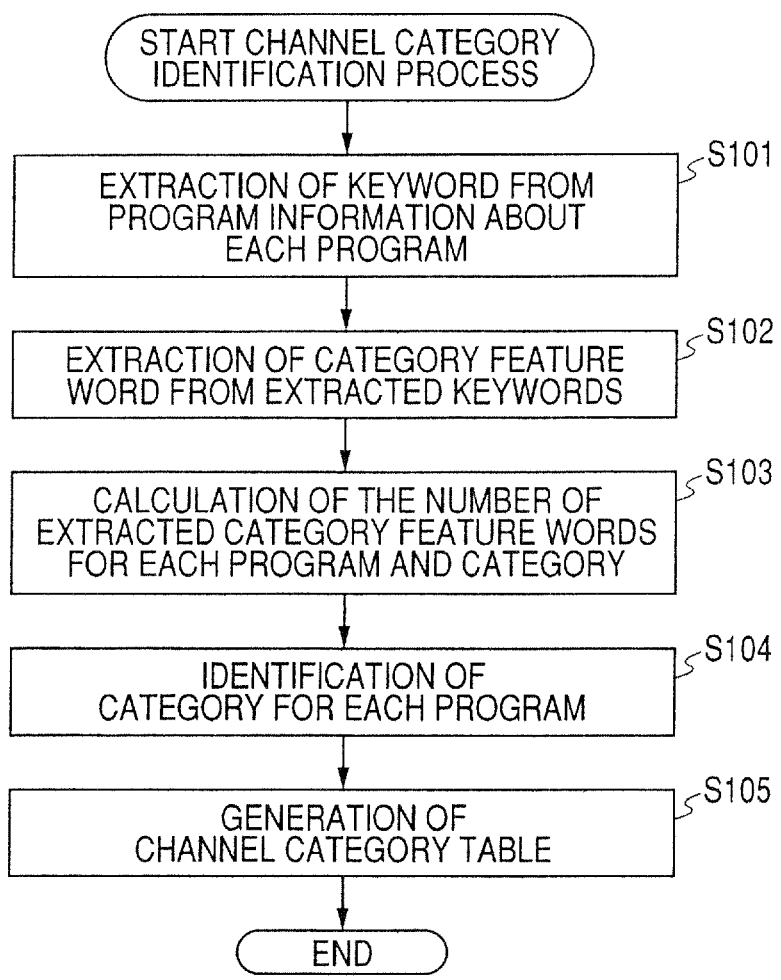
FIG. 22 is a flowchart of a process of channel category identification to be executed by the information processing device in a third embodiment of the invention.
Figures 23, 24:
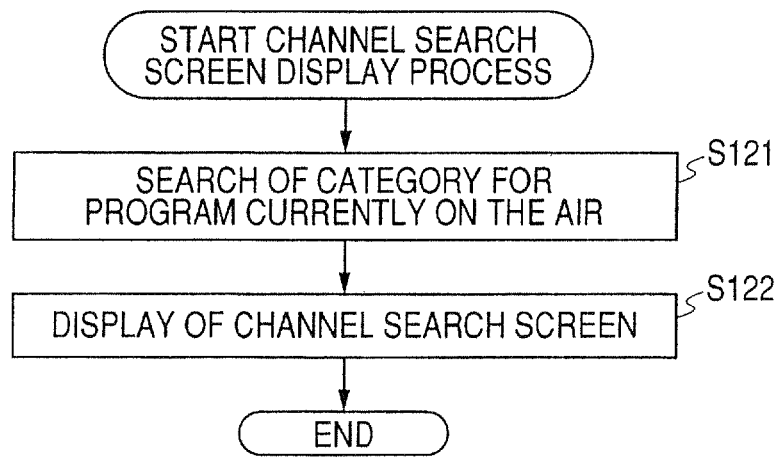
FIG. 23 is a diagram showing still another exemplary channel category table.
FIG. 24 is a flowchart of a process of channel search screen display to be executed by the information processing device in the second embodiment of the invention.

An embodiment of the invention is directed to an information processing method or program that includes the steps of: extracting, from program information, a category feature word being a keyword representing a category feature (e.g., steps S1 and S2 of FIG. 3, steps S21 and S22 of FIG. 13, or steps S101 and S102 of FIG. 22); identifying a channel by category based on the category feature word extracted from the program information for a program to be broadcast on the channel (e.g., steps S3 to S5 of FIG. 3, steps S23 to S25 of FIG. 13, or steps S103 and S104 of FIG. 22); and exercising control over the channel to be displayed after category classification (e.g., step S81 of FIG. 20 or step S122 of FIG. 24).

In the below, embodiments of the invention are described by referring to the accompanying drawings.

FIG. 1 is a block diagram showing an embodiment of the hardware configuration of an information processing device to which the invention is applied.

An information processing device 100 is a television receiver including therein an HDD (Hard Disk Drive), and serves not only to provide images and audio of a program but also to acquire data about the program from broadcast waves, and store the acquired program data into the HDD, i.e., record the program. The images and audio of the program are respectively provided by a display 114 and a speaker 116, and the broadcast waves are those received as appropriate by an antenna that is not shown.

This information processing device 100 also has a function of acquiring any incoming EPG or any EPG through downloading from any predetermined server connected over the Internet. The EPG includes, for each program, a program title, a category, a broadcast date and time, program cast members, program overview, and others.

The information processing device 100 is connected to a network, and has a function of acquiring news and news stories such as comments through reception of RSS (Resource Description Framework Site Summary) information. The RSS information is distributed from sites of newspaper companies or various portal sites whichever registered by a user in advance. That is, the information processing device 100 includes therein an RSS reader for reading of RSS information.

A CPU (Central Processing Unit) 101 runs programs stored in a ROM (Read Only Memory) 103, and programs loaded by an HDD 120 into a RAM (Random Access Memory) 102 via an HDD I/F (interface) 119 and a bus 104. By program running, the CPU 101 exercises control over the operation of the components in accordance with user's commands received by a U/I (User Interface) control section 105, i.e., commands coming from a remote controller 136 or others.

The CPU 101 may be a Cell, which is described in "The Birth of Cell", Nikkei Electronics (Nikkei BP) 28 Feb. 2005: 89-117.

Being under the control of the CPU 101, a tuner 106 receives a broadcast signal from an antenna that is not shown, and outputs the reception signal to a demodulator 107.

The demodulator 107 demodulates the reception signal provided by the tuner 106, and to a TS decoder 108, forwards transport streams having been on the air on any predetermined channel.

Also being under the control of the CPU 101, the TS decoder 108 extracts, using a RAM 109, any predetermined streams from the transport streams provided by the demodulator 107. The TS decoder 108 then forwards a packet configuring the extracted streams onto the bus 104 or to an AV decoder 110. The packet, i.e., program data, provided onto the bus 104 is supplied to the HDD 120 via the HDD I/F 119 for storage therein. The EPG acquired by the TS decoder 108 is also supplied to the HDD 120 as appropriate for storage therein.

Using a RAM 111, the AV decoder 110 decodes video data, i.e., video packet, and audio data, i.e. audio packet, coming from the TS decoder 108. The video signal being the decoding result is forwarded to a MUX 113, and the audio signal to a MUX 115.

Being under the control of the CPU 101, a display controller 112 generates a video signal for use to display various types of images on the display 114, and forwards the resulting video signal to the MUX 113.

Based on the video signal coming from the AV decoder 110 and the video signal, i.e., OSD (On Screen Display) signal, coming from the display controller 112, the MUX 113 displays programs, various screens, and images on the display 114. The screens are those for introducing RSS comments and for operations varying in type.

The MUX 115 makes the speaker 116 to output audio corresponding to the audio signal coming from the AV decoder 110.

An SIO (Serial I/O) controller 117 puts a high-speed modem 131 under the control for establishing a connection with a Web server 133 over the Internet 132, and downloads EPGs or others whenever needed. The EPGs as a result of downloading are supplied to the HDD 120 for storage therein. The SIO controller 117 makes an access to any user-registered site of distributing RSS comments, and receives the RSS comments. The RSS comments acquired as such are also supplied to the HDD 120 for storage therein.

An IEEE (Institute of Electrical and Electronics Engineers) 1394 I/F 118 captures video data from a video camera 134, which is connected thereto over an IEEE 1394 cable.

The HDD I/F 119 stores the data coming over the bus 104 into the HDD 120, and if required, supplies the data in the HDD 120 to the components in need over the bus 104.

A card I/F 121 makes a memory card 135 to record thereon the data provided over the bus 104, and reads the data recorded on the memory card 135 for output onto the bus 104. The memory card 135 is being attached to a card slot 122.

Figure 2:
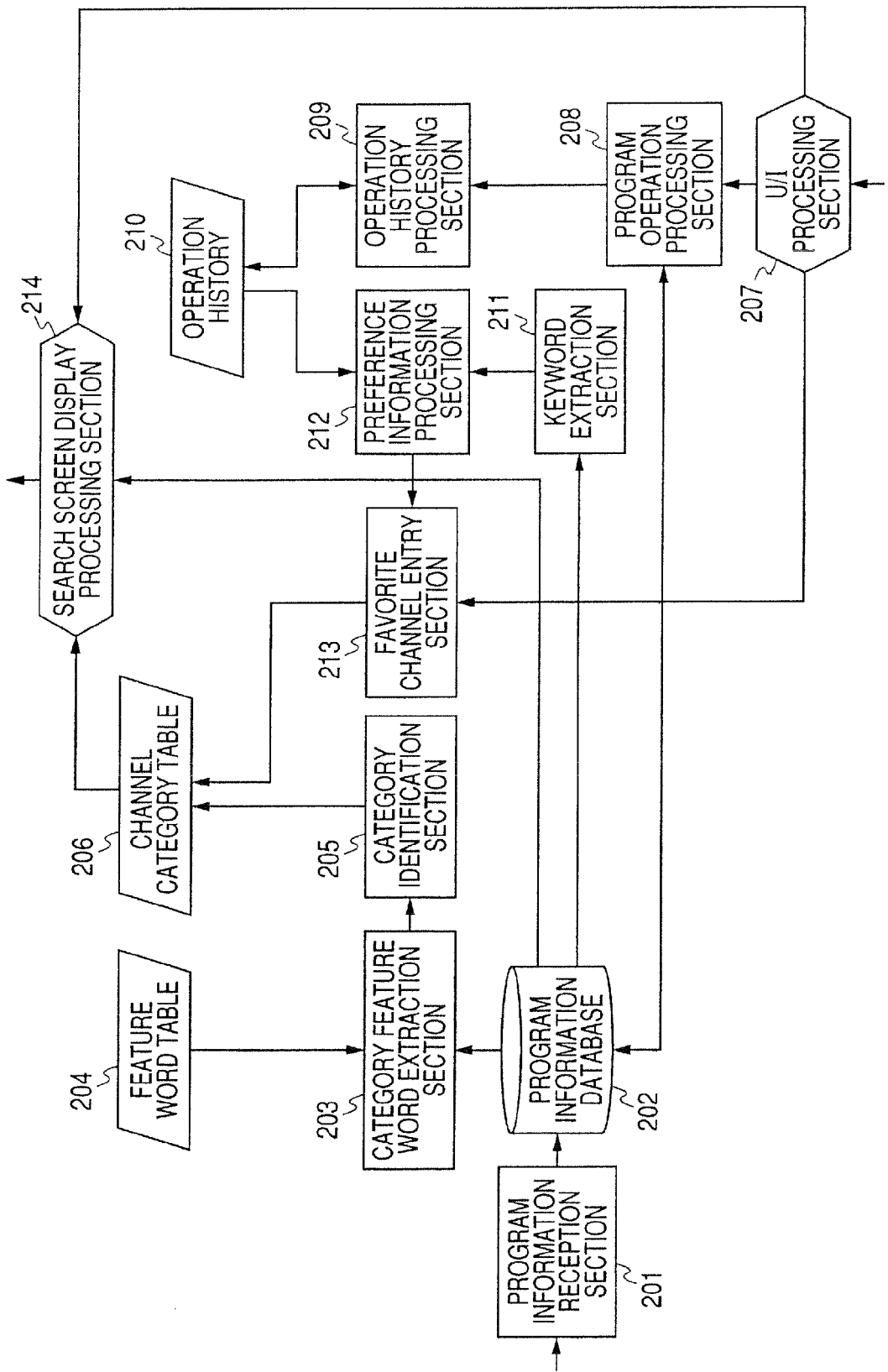
FIG. 2 is a block diagram showing a part of the functional configuration of the information processing device of FIG. 1.

FIG. 2 is a block diagram showing a part of the functional configuration of the information processing device 100. At least a part of the functional components of FIG. 2 are implemented by the CPU 101 of FIG. 1 running any predetermined program.

In view of the functional configuration, the information processing device 100 is configured to include a program information reception section 201, a program information database 202, a category feature word extraction section 203, a feature word table 204, a category identification section 205, a channel category table 206, a U/I (User Interface) processing section 207, a program operation processing section 208, an operation history processing section 209, an operation history 210, a preference information processing section 212, a favorite channel entry section 213, and a search screen display processing section 214.

The program information reception section 201 receives program information, e.g., EPGs, about programs to be broadcast on channels available for a user to select by the information processing device 100. The program information reception section 201 stores the received program information into the program information database 202.

The program information database 202 classifies the program information received by the program information reception section 201 according to channels, and stores the classification results. The details about the program information will be described later by referring to FIGS. 4 and 5.

The category feature word extraction section 203 extracts a category feature word from program information about each program based on the feature word table 204 in which category feature words are entered for each category. The category feature word is a keyword representing the feature of each category for use for classification of channels available for a user to select. The category feature word extraction section 203 classifies the extracted category feature words according to programs and categories, and the classification results are supplied to the category identification section 205.

As will be described later by referring to FIG. 3, the category identification section 205 identifies the category for each of the channels available for a user to select. This category identification is made based on the extracted category feature words. The category identification section 205 generates the channel category table 206, which indicates the categories of each of the channels.

The U/I processing section 207 acquires commands issued by a user, i.e., commands from the remote controller 136 or others, and notifies the user commands to the component, i.e., the program operation processing section 208, the favorite channel entry section 213, or the search screen display processing section 214.

Based on the user commands, the program operation processing section 208 goes through an operation process with respect to any program in command while acquiring program information from the program information database 202 as appropriate. The operation process here includes program display, recording programming, recording, erasing, dubbing, and others. The program operation processing section 208 supplies information about any program through with the operation process as above, the details of the operation process, and others to the operation history processing section 209.

The operation history processing section 209 records, on the operation history 210, the history of operation applied to the programs in accordance with the user commands.

The keyword extraction section 211 reads, from the program information database 202, the program information about any program designated by the preference information processing section 212, and extracts a keyword(s) from each field of the program information by morphological analysis, for example. The keyword extraction section 211 supplies the extracted keywords to the preference information processing section 212.

As will be described later by referring to FIG. 19, the preference information processing section 212 calculates the degree of preference of a user for each program. This calculation is made based on the operation history 210 and the keywords extracted for each program by the keyword extraction section 211. As will be described later by referring to FIG. 19, the preference information processing section 212 calculates the degree of preference of the user for each channel based on the degree of preference calculated for each program. The preference information processing section 212 supplies information about the calculated degree of preference to the favorite channel entry section 213.

As will be described later by referring to FIG. 19, the favorite channel entry section 213 enters any channel showing the high degree of user's preference into the channel category table 206 as a favorite channel. The favorite channel entry section 213 also enters any channel designated by a user into the channel category table 206 as a favorite channel. This entry is made based on the user commands acquired via the U/I processing section 207.

As will be described later by referring to FIG. 21 and others, when receiving a user command of displaying a channel search screen, via the U/I processing section 207, the search screen display processing section 214 displays a channel search screen on the display 114. The channel search screen is for use by a user to search his or her desired channel, and such screen display is made based on the program information stored in the program information database 202 for each program and the channel category table.

The components, i.e., the program information database 202, the feature word table 204, the channel category table 206, and the operation history 210 are stored in the HDD 120 of FIG. 1, for example.

By referring to FIGS. 3 to 24, described next is the operation of the information processing device 100.

Figure 3:
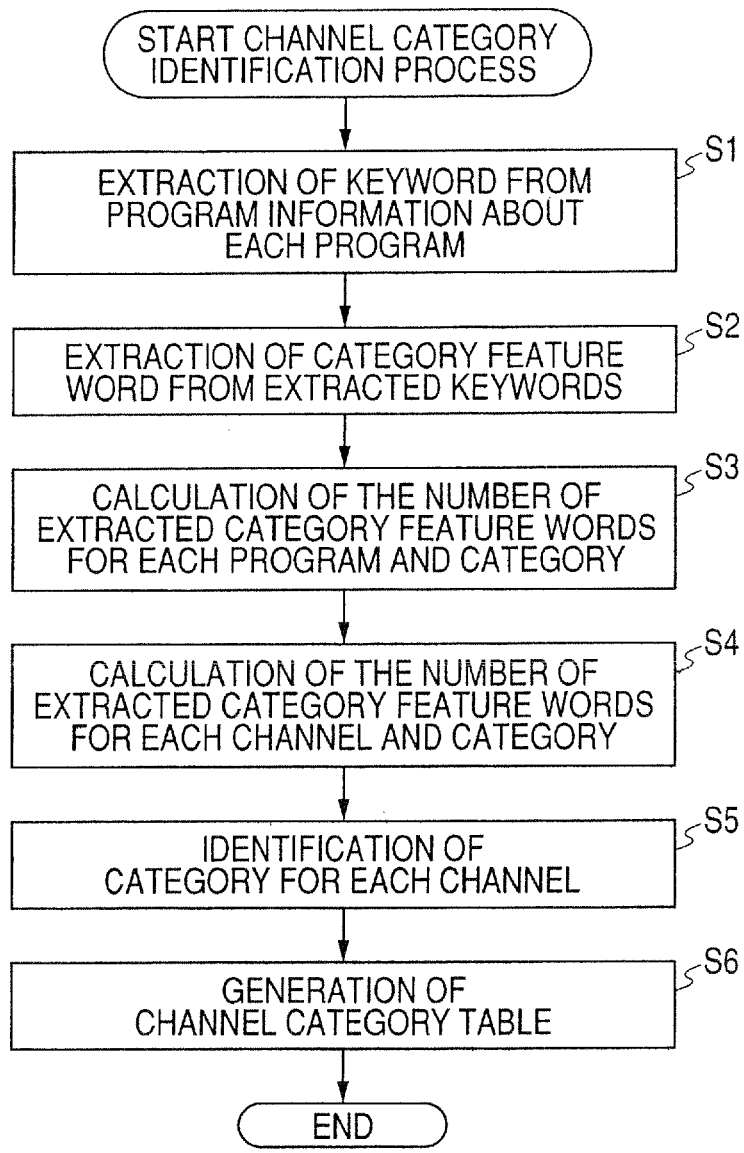
FIG. 3 is a flowchart of a process of channel category identification to be executed by the information processing device in a first embodiment of the invention.

First of all, by referring to the flowchart of FIG. 3, described is a process of channel category identification to be executed by the information processing device 100 in a first embodiment. Note here that this process is executed at established time intervals, e.g., every other day, week, or month.

In the below, for the sake of brevity, described is an exemplary case of classifying two channels of A and B into two categories of news and sports.

In step S1, the category feature word extraction section 203 extracts a keyword(s) from the program information about each program. Specifically, the category feature word extraction section 203 reads, from the program information database 202, the program information about any program to be broadcast on channels available for selection by the information processing device 100 during a predetermined period of time, or reads the program information about any program that is already broadcast. The period for such reading of program information is set based on the interval for the process of channel category identification. If the process of channel category identification is executed at every other week, for example, the program information to be read is that of programs that are to be or have been broadcast in the past week, a week before or after today, and in a week from today.

In the below, for the sake of brevity, exemplified is a case that program information about five programs is read for each channel. FIG. 4 shows exemplary program information read about the programs on the channel A, and FIG. 5 shows exemplary program information read about the program on the channel B.

As shown in FIGS. 4 and 5, the program information includes four fields for unique identification of programs. The four fields include a program ID, the name of a channel for program broadcast, a program title, and a program description being the program summary. The program ID is the one assigned to every program for unique identification.

The category feature word extraction section 203 extracts a keyword(s) from each of the fields in the program information by morphological analysis, for example. FIG. 6 shows exemplary keywords extracted from the fields in the program information of the program A2 of FIG. 4, i.e., program with the program ID of A2. In FIG. 6 example, from the channel name of the program A2, a keyword of "CMNj" is extracted, and from the program title of the program A2, keywords of "Low Double", "today", "CMN", and "US" are extracted. From the program description of the program A2, keywords of "CNN", "experienced", "anchor", "Low Double", "general-interest", two of "business", "news", "program", "entertainment", two of "industry", "sports", and "information" are extracted.

Note that, in FIG. 6, exemplified is the case of extracting only nouns as keywords, but alternatively, any non-noun words may be extracted as keywords.

In step S2, the genre feature word extraction section 203 extracts a genre feature word from the extracted keywords. Specifically, from the keywords extracted from the program information about the program, the genre feature word extraction section 203 extracts, for each program, any keyword being the same as any of the genre feature words found in the feature word table 204.

FIG. 7 shows an example of the feature word table 204. In the feature word table 204 of FIG. 7, category feature words representing the characteristics of the category of "news" include "business", "economy", "news", "anchor", "crew", "scoop", "politics", "terrorism", "topics", "reports", "incident", and others. Hereinafter, these category feature words for the category of "news" are also referred to as news feature words. Category feature words representing the characteristics of the category of "sports" include "sports", "game", "good play", "sumo wrestling", "cheerleading", "championship", "competition", "golf", "coach", "soccer", "table tennis", "billiards", and others. Hereinafter, these category feature words for the category of "sports" are also referred to as sports feature words.

In this case, from the program information of the program A2, the words circled in FIGS. 6 and 7, i.e., "anchor", two of "business", and "news", are extracted as news feature words, and the word boxed in FIGS. 6 and 7, i.e., "sports", is extracted as a sports feature word.

The category feature word extraction section 203 classifies the extracted category feature words according to programs and categories, and the classification results are supplied to the category identification section 205.

In step S3, the category identification section 205 counts the number of the extracted category feature words for every program and category. FIG. 8 shows an exemplary counting result of the category feature words in the programs of the channel A. The counting result of FIG. 8 shows that three news feature words and no sports feature word are extracted from the program information about the program A1, and four news feature words and one sports feature word are extracted from the program information about the program A2. From the program information about the program A3, four news feature words and five sports feature words are extracted, and from the program information about the program A4, three news feature words and no sports feature word are extracted. From the program information about the program A5, three news feature words and one sports feature word are extracted.

FIG. 9 shows an exemplary counting result of the category feature words of programs on the channel B. The counting result of FIG. 9 shows that no news feature word and three sports feature words are extracted from the program information about the program B1, and no news feature word and six sports feature words are extracted from the program information about the program B2. From the program information about the program B3, three news feature words and four sports feature words are extracted, and from the program information about the program B4, no news feature words and four sports feature words are extracted. From the program information about the program B5, no news feature word and no sports feature word is extracted.

Note here that when two or more of the same category feature word are extracted for a program, the extracted number is counted and reflected in the counting result.

In step S4, the category identification section 205 counts the number of the extracted category feature words for every channel and category. FIG. 10 is a diagram showing an exemplary counting result for the category feature words of the channel A. The counting result of FIG. 10 shows that 19 news feature words and six sports feature words are extracted from the program information of programs to be broadcast on the channel A. FIG. 11 is a diagram showing an exemplary counting result for the category feature words of the channel B. The counting result of FIG. 11 shows that three news feature words and 17 sports feature words are extracted from the program information of programs to be broadcast on the channel B.

In step S5, the category identification section 205 identifies the category for each channel. Specifically, the category identification section 205 identifies the category showing the largest number for the extracted category feature words as the category for the channel. This identification is made based on the counting result of step S4, i.e., the result of counting the extracted category feature words for each channel and category. With an example of the channel A, because the news feature words are larger in number than the sports feature words, the channel A is determined as falling in the category of "news". With an example of the channel B, because the sports feature words are larger in number than the news feature words, the channel B is determined as falling in the category of "sports".

Exemplified above is the case with the two categories, and when there are three or more categories, the category showing the largest number for the extracted category feature words is identified as being the category for the channel.

As to the category showing the largest number for the extracted category feature words, when the number is not exceeding a predetermined threshold number, the channel may be classified into the category of "others" because it is determined as falling in no specific category.

When a channel includes a plurality of categories each showing the number of extracted category feature words being larger than a predetermined threshold value, the channel may be determined as falling in the plurality of categories.

When the difference is not exceeding the predetermined threshold value between the category with the largest number of the extracted category feature words and the category with the second largest number thereof, the channel may be determined as falling in no specific category, and may be classified into the category of "others".

In step S6, the genre identification section 205 generates the channel genre table 206, and this is the end of the process of channel genre identification. FIG. 12 shows an example of the channel genre table 206. The channel genre table 206 includes three fields of channel, genre, and favorite. The channel genre table 206 of FIG. 12 shows that the channel A falls in the genre of "news", and the channel B falls in the genre of "sports". Note here that the field of "favorite" indicates that any channel in the field is a user's favorite, and is updated in a process that will be described later by referring to FIG. 19.

The category identification section 205 stores the channel category table 206 generated as such into the HDD 120 of FIG. 1, for example.

By referring to the flowchart of FIG. 13, described next is the process of channel category identification to be executed by the information processing device 100 in a second embodiment. Note here that this process is executed at established time intervals, e.g., every other day, week, or month.

The processes of steps S21 to S23 are the same as those described above in steps S1 to S3 of FIG. 3, and are not described twice. With the processes of steps S21 to S23, extraction of category feature word is made from program information of each program, and the resulting number of the extracted category feature words is counted for each program and channel. In the below, exemplified is a case where the counting results of FIGS. 8 and 9 are derived.

In step S24, the category identification section 205 identifies the category for each program. Specifically, the category identification section 205 identifies the category showing the largest number for the extracted category feature words as the category for the program. This identification is made based on the counting result of step S23, i.e., the result of classifying the extracted category feature words according to programs and categories.

FIG. 14 shows an exemplary result of identifying the category for each program on the channel A, and FIG. 15 shows an exemplary result of identifying the category for each program on the channel B. In FIGS. 14 and 15, the category with the field value of "TRUE" is the category for the program, and the category with the field value of "FALSE" is the category not for the program.

With the program A1, for example, as shown in FIG. 8, the sports feature words are extracted more than the news feature words, the program A1 is determined as falling in the category of "news". With the program B5, for example, as shown in FIG. 9, no news feature word and no sports feature word is extracted so that the program B5 is determined as falling in no category.

Exemplified above is the case with the two categories, and when there are three or more categories, the category showing the largest number for the extracted category feature words is identified as being the category for the channel.

As to the category showing the largest number for the extracted category feature words, when the number is not exceeding a predetermined threshold number, the program may be determined as falling in no specific category.

When a channel includes a plurality of categories each showing the number of extracted category feature words being larger than a predetermined threshold value, the program may be determined as falling in the plurality of categories.

When the difference is not exceeding the predetermined threshold value between the category with the largest number of the extracted category feature words and the category with the second largest number thereof, the channel may be determined as falling in no specific category.

In step S25, the category identification section 205 identifies the category for each channel. First of all, the category identification section 205 counts, for each category, the number of programs to be broadcast on each channel. This counting is made based on the counting result of step S24. FIG. 16 shows an exemplary result of counting, for each category, the number of programs to be broadcast on the channel A. In FIG. 16 example, the counting result shows that the programs to be broadcast on the channel A include four news programs in the category of "news", and one sport program in the category of "sports". FIG. 17 shows an exemplary result of counting, for each category, the number of programs to be broadcast on the channel B. In FIG. 17 example, the counting result shows that the programs to be broadcast on the channel B include no news program in the category of "news", and four sport program in the category of "sports".

The category identification section 205 identifies the category showing the largest number for the programs to be broadcast on each channel as the category for the channel. This identification is made based on the result of counting the programs to be broadcast on each channel on the category basis. For example, based on the counting result of FIG. 16, the channel A is determined as falling in the category of "news", and based on the counting result of FIG. 17, the channel B is determined as falling in the category of "sports".

Exemplified above is the case with the two categories, and when there are three or more categories, in each of the channels, the category showing the largest number of the programs to be broadcast on the channel is identified as being the category for the channel.

As to the category showing the largest number of the programs, when the number is not exceeding a predetermined threshold number, the channel may be classified into the category of "others" because it is determined as falling in no specific category.

When a channel includes a plurality of categories each showing the number of programs larger than a predetermined threshold value, the channel may be determined as falling in the plurality of categories.

When the difference is not exceeding the predetermined threshold value between the category with the largest number of the programs and the category with the second largest number thereof, the channel may be determined as falling in no specific category, and may be classified into the category of "others".

Alternatively, the broadcast time may be counted on a category basis for programs to be broadcast on each channel, and based on the counting results, the channels may be identified by category. For example, any category showing the longest broadcast time in each channel may be determined as the category for the channel.

Similarly to the process of step S6 of FIG. 3 described above, in step S26, such a channel category table 206 as shown in FIG. 18 is generated, and this is the end of the process of channel category identification.

By referring to the flowchart of FIG. 19, described next is the process of favorite channel entry to be executed by the information processing device 100. Note here that this process is executed at established time intervals, e.g., every other day, week, or month.

In step S61, the keyword extraction section 211 extracts a preference keyword(s). Specifically, the preference information processing section 212 searches any program being an operation target in a predetermined period of time, e.g., a week in the past. This search is made based on the operation history 210. The preference information processing section 212 supplies information about the found program to the keyword extraction section 211. The keyword extraction section 211 reads program information about thus found program, i.e., program information about the program that has been an operation target in a predetermined period of time. This information reading is made from the program information database 202. The keyword extraction section 211 extracts a keyword(s) from each of the fields of the program information read as such by morphological analysis, for example. The keyword extraction section 211 classifies the extracted keywords according to programs for supply to the preference information processing section 212. The preference information processing section 212 keeps the extracted keywords as preference keywords.

In step S62, the preference information processing section 212 assigns weights to each of the preference keywords. Specifically, the preference information processing section 212 assigns points to each of the preference keywords in accordance with the operation details applied to a program from which the preference keywords are extracted, and calculates the total value of the points. The point assignment is made to each of the preference keywords depending on the degree of user interest assumed by the operation details for each program, i.e., +3 points to any preference keyword extracted from program information of any displayed program, +1 point to any preference keyword extracted from program information of any recording-programming program, +2 points to any preference keyword extracted from program information of any recording-programmed program, +4 points to any preference keyword extracted from program information of any dubbed program, and −1 point to any preference keyword extracted from program information of any erased program.

When any one specific preference keyword is extracted from a plurality of programs, the preference keyword is provided with the respective points in accordance with the operation details for the corresponding program. When any one specific program is subjected to a plurality of operations, all of the point(s) corresponding to the operation details are provided to any preference keyword extracted from the program information of the programs.

The preference information processing section 212 assigns weights to each of the preference keywords in accordance with the total value of the points assigned as such. That is, with the larger value of the points, in other words, with the higher degree of user interest, weights to be assigned to each of the preference keywords will be large in value. On the other hand, with the smaller value of the points, in other words, with the lower degree of user interest, weights to be assigned thereto will be small in value.

In step S63, the keyword extraction section 211 extracts a keyword(s) from the program information of each program. Specifically, the preference information processing section 212 supplies information of a command for extracting any relevant keyword to the keyword extraction section 211. This information supply is made to every program to be broadcast on channels available for selection by the information processing device 100 during a predetermined period of time. Note here that this predetermined period of time is set based on the interval of the process of favorite channel entry, for example. When the process of favorite channel entry is executed for every other week, for example, the predetermined period of time will be set as the past week, a week before or after today, and a week from today.

The keyword extraction section 211 reads, from the program information database 202, the program information about every program in any designated period of time. The keyword extraction section 211 extracts a keyword(s) from each field of the program information read as such by morphological analysis, for example. The keyword extraction section 211 classifies the extracted keywords according to programs for supply to the preference information processing section 212.

In step S64, the preference information processing section 212 calculates the degree of preference for each program. Specifically, first of all, the preference information processing section 212 extracts a preference keyword found in the keywords extracted from the program information of each program. The preference information processing section 212 then calculates the total value of the weight assignment of the extracted preference keywords as the degree of preference for the program. Note here that when two or more of any one specific preference keyword are found in a program, the number of the keyword is added for weight assignment.

In step S65, the preference information processing section 212 calculates the degree of preference for each channel. Specifically, the preference information processing section 212 calculates the total value of the degree of preference for the programs to be broadcast on each of the channels as the degree of preference for the channel. The preference information processing section 212 supplies the information indicating the degree of preference for each of the channels to the favorite channel entry section 213.

In step S66, the favorite channel entry section 213 enters a favorite channel, and this is the end of the process of favorite channel entry. Specifically, the favorite channel entry section 213 puts the channels into a descending order of the degree of preference, and a predetermined number of channels from the top are entered into the channel category table 206 as favorite channels.

Alternatively, a user may enter the favorite channels partially or entirely using the remote controller 136 or others.

By referring to the flowchart of FIG. 20, described next is a process of channel search screen display to be executed by an information processing system 1. Note that this process is started when the search screen display processing section 214 receives a command via the U/I processing section 207. The command is of displaying a channel search screen issued by a user using the remote controller 136 or others.

In step S81, the search screen display processing section 214 displays the channel search screen, and this is the end of the process of channel search screen display. Specifically, the search screen display processing section 214 makes the display 114 to display thereon such a channel search screen as shown in FIG. 21, for example. This screen display is made based on the program information stored in the program information database 202 for each program, and the channel category table 206. Herein, the dotted lines in FIG. 21 are those provided for convenience, and are not actually displayed on the channel search screen.

The channel search screen is configured by a category array R1 and a channel array R2, which intersect each other at slightly upper left with reference to the center of the screen. The category array R3 includes, in line, icons and characters each indicating a category for use of channel classification, and the channel array R2 includes, in line, icons and characters each indicating a channel in any category selected from those in the category array R1.

Figure 21:
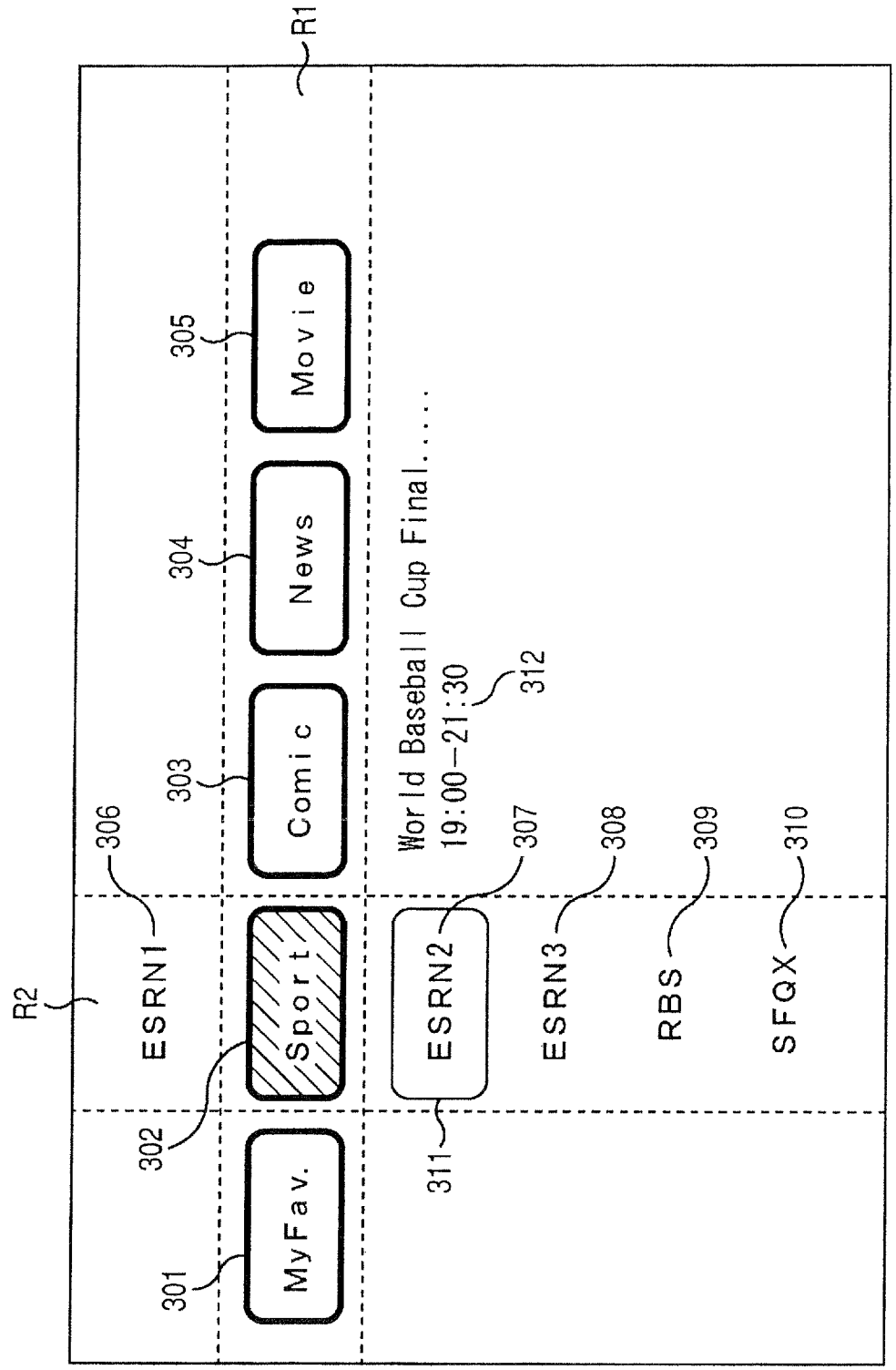
FIG. 21 is a diagram showing an exemplary channel search screen.

As exemplarily shown in FIG. 21, the category array R1 is displayed in the horizontal direction, i.e., lateral direction, of the display 114, and the channel array R2 is displayed in the heightwise direction, i.e., vertical direction, which is orthogonal to the direction of the category array R1.

In FIG. 21 example, the category array R1 includes icons 301 to 305, i.e., the icon 301 represents the category configured by favorite channel(s), the icon 302 represents the category of "sports", the icon 303 represents the category of "comic", the icon 304 represents the category of "news", and the icon 305 represents the category of "movie". That is, the favorite channel(s) are displayed to a user as a channel(s) in another group from the predetermined categories.

Among the icons displayed in the category array R1, the category indicated by the icon displayed in the channel array R2, i.e., the shaded icon 302 in FIG. 21 example, is the user-selected category. For the aim of showing a user the selected category at a glance, the icons in the channel array R2 are displayed differently from others, e.g., color, size, or pattern.

Alternatively, the icons are surely not the only option to display the categories, and character strings may be also a possibility, for example.

In FIG. 21 example, the channel array R2 includes channel names 306 to 310 in the categories represented by the icons displayed in the channel array R2. That is, in the channel search screen, the channels are displayed under the classification of categories. More precisely, in the channel search screen, displayed are a list of categories, and a list of channels in any one of the categories selected among others.

Among the channel names displayed in the channel array R2, the channel under the channel name 307 with a cursor 311 put thereon directly below the icon 302, i.e., ESPN2 in FIG. 21 example, is the user-selected channel. On the right side of the cursor 311, displayed are the titles of programs 312 currently being on the air on the user-selected channel, and the broadcast time thereof.

Herein, the character strings are surely not the only option, and icons or others may be used to display channels of the currently-selected category.

In the channel search screen, a user can scroll right and left the icons displayed in the category array R1 using the remote controller 136 or others. Such scrolling enables category selection change, display of any icon representing a category(s) not displayed in the display 114 in the category array R1, and others. Moreover, through category selection change, i.e., through icon change in the channel array R2, the channel array R2 displays therein the names of channels belonging to any newly-selected category(ies).

The user can scroll also up and down the channel names in the channel array R2 using the remote controller 136 or others. Such scrolling enables channel selection change or display of channel names currently not displayed in the display 114 into the channel array R2, for example. Through channel selection change, i.e., through channel name change in the cursor 311, the program titles and the broadcast times to be displayed on the right side of the cursor 311 can be also changed.

A user may use the remote controller 136 or others to apply operations to the currently-selected channel, e.g., operation of displaying any program currently on the air on the channel or operation of recording programming.

Alternatively, the display order of the channel names in the channel array R2 may be changed to, for example, the order of user specification, the descending order of viewing time in a predetermined period, the descending order of viewing frequency in a predetermined period, or the descending order of adherence to the categories.

Note here that FIG. 21 shows merely an exemplary channel search screen, and the method of FIG. 21 is surely not the only option for channel display after classification according to categories. As an example, a screen may display thereon a channel name of a channel in a category together with the category, and the screen may be changed for every category, for example. As another example, a first screen may display only categories, and any channel in the category selected in the screen may be displayed in a second screen or others.

As such, the channels are displayed after appropriate classification according to categories based on any objective data so that a user can change his or her desired channel with ease. What is better, the user sees his or her favorite channel(s) that are automatically extracted so that the user can search his or her desired channel with much ease.

In the above embodiment, irrespective of the category of a program currently on the air, the result of channel category identification is used as a basis to classify channels according to categories for display to a user. Alternatively, the category of a program currently on the air may be used as a basis to classify the channels according to categories for display to the user. By referring to FIGS. 22 to 24, described next is a process when the channels are classified according to categories for display to a user based on the category of a program currently on the air.

First of all, by referring to the flowchart of FIG. 22, described is the process of channel category identification to be executed by the information processing device 100. Exemplified here is a case that the channels are classified according to categories based on the category of a program currently on the air, and the classification results are displayed to a user. Note here that this process is executed at established time intervals, e.g., every other day, week, or month.

Figure 13:
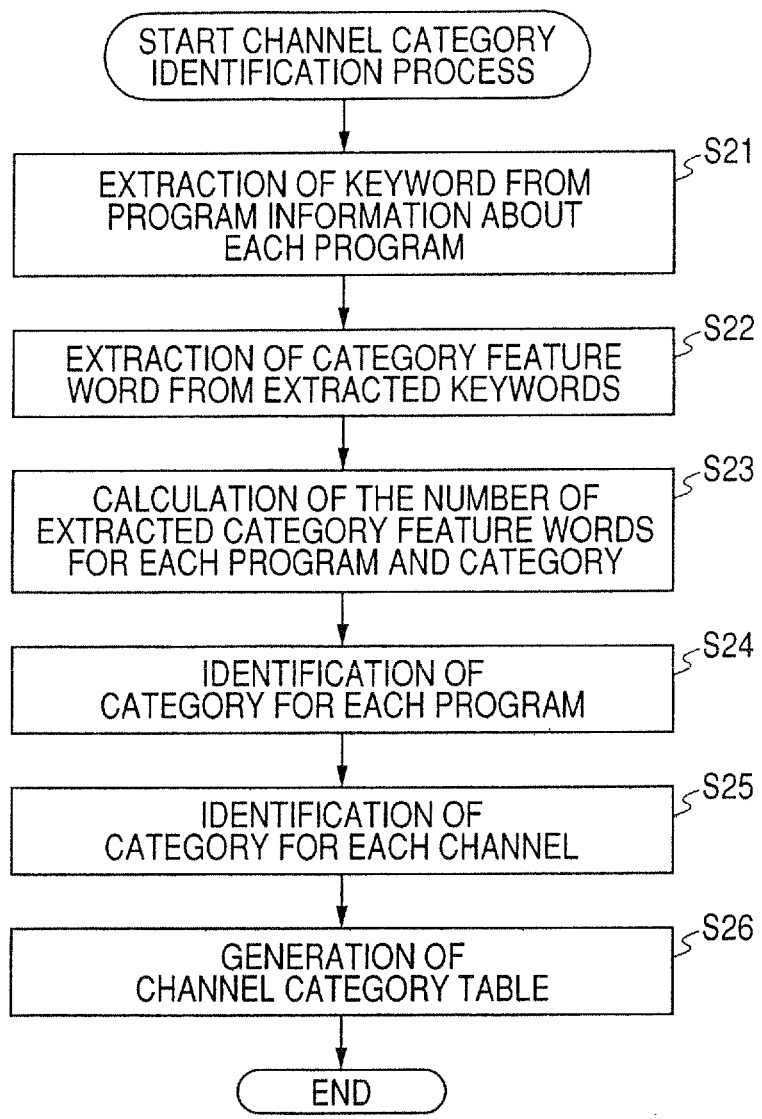
FIG. 13 is a flowchart of a process of channel category identification to be executed by the information processing device in a second embodiment of the invention.

The processes of steps S101 to S104 are the same as those in steps S21 to S24 of FIG. 13 described above, and are not described twice. With the processes of steps S101 to S104, programs to be broadcast on each channel are identified by category.

In step S105, the category identification section 205 generates the channel category table 206, and this is the end of the process of channel category identification. FIG. 23 shows an example of the channel category table 206 to be generated at this time. In FIG. 23 example, the channel category table 206 includes four fields of channel, program ID, category, and favorite.

The channel category table 206 of FIG. 23 shows that, among programs to be broadcast on the channel A, the programs A1, A2, A4, and A5 belong to the category of "news", and the program A3 belongs to the category of "sports". Among programs to be broadcast on the channel B, the channel category table 206 shows that the programs B1 to B4 belong to the category of "sports", and the program B5 belongs to no specific category but to the category of "others". That is, in the channel category table 206 of FIG. 23, each channel is identified by category for each program.

Figure 19:
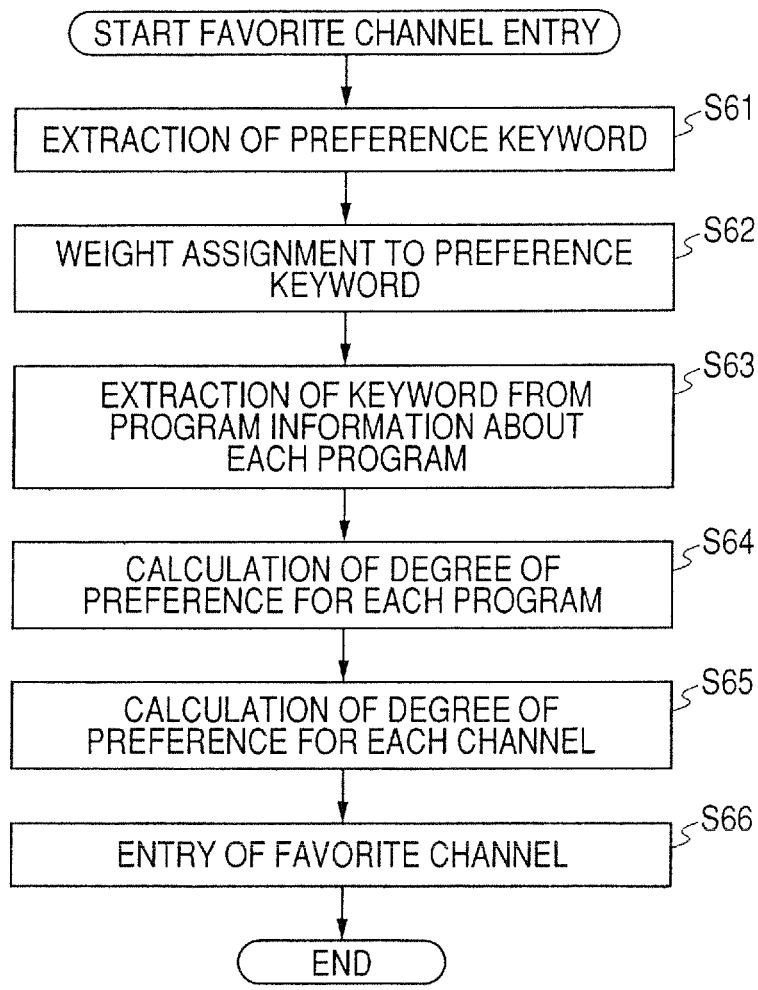
FIG. 19 is a flowchart of a process of favorite channel entry to be executed by the information processing device.

The process of favorite channel entry in the above case, i.e., when the channels are classified according to categories based on the category of a program being on the air for display to a user, is the same as that described by referring to FIG. 19, and thus is not described again.

By referring to the flowchart of FIG. 24, described next is the process of channel search screen display to be executed by the information processing system 1 in the above case, i.e., when the channels are classified according to categories based on the category of a program being on the air for display to a user. Note here that this process is started when the search screen display processing section 214 receives a command via the U/I processing section 207. The command is of displaying a channel search screen, issued by a user using the remote controller 136 or others.

In step S121, the search screen display processing section 214 searches the category of a program currently on the air. Specifically, the search screen display processing section 214 searches the category for the program currently on the air for each of the channels. This category search is made based on the program information in the program information database 202 stored for each program, and the channel category table 206. The search screen display processing section 214 performs category setting to each of the channels in such a manner that the channels are each set to the category of a program currently on the air thereon.

In step S122, the search screen display processing section 214 makes the display 114 display thereon a channel search screen similarly to the process of step S81 of FIG. 20 described above, and this is the end of the process of channel search screen display. Note that, at this time, unlike the process of step S81, the channels are each classified, for display, based on the category of a program currently on the air.

In such a manner, the channels can be each classified according to categories based on the category of a program currently on the air.

Note that, even when no channel search screen is displayed, using the remote controller 136 or others, a user may be allowed to change the category selection, or change channels in any selected category.

Note that the invention is applicable to any device with a function of leaving channel selection of television broadcasting or others to a user, e.g., television receiver, recording devices varying in type, and tuner.

The above-described sequence of processes may be executed by hardware or software. If such processes are to be executed by software, a program configuring the software is installed from a program recording medium to a computer incorporated to any specific hardware, a general-purpose personal computer capable of various types of functions through installation of the programs varying in type, or the like.

Figure 25:
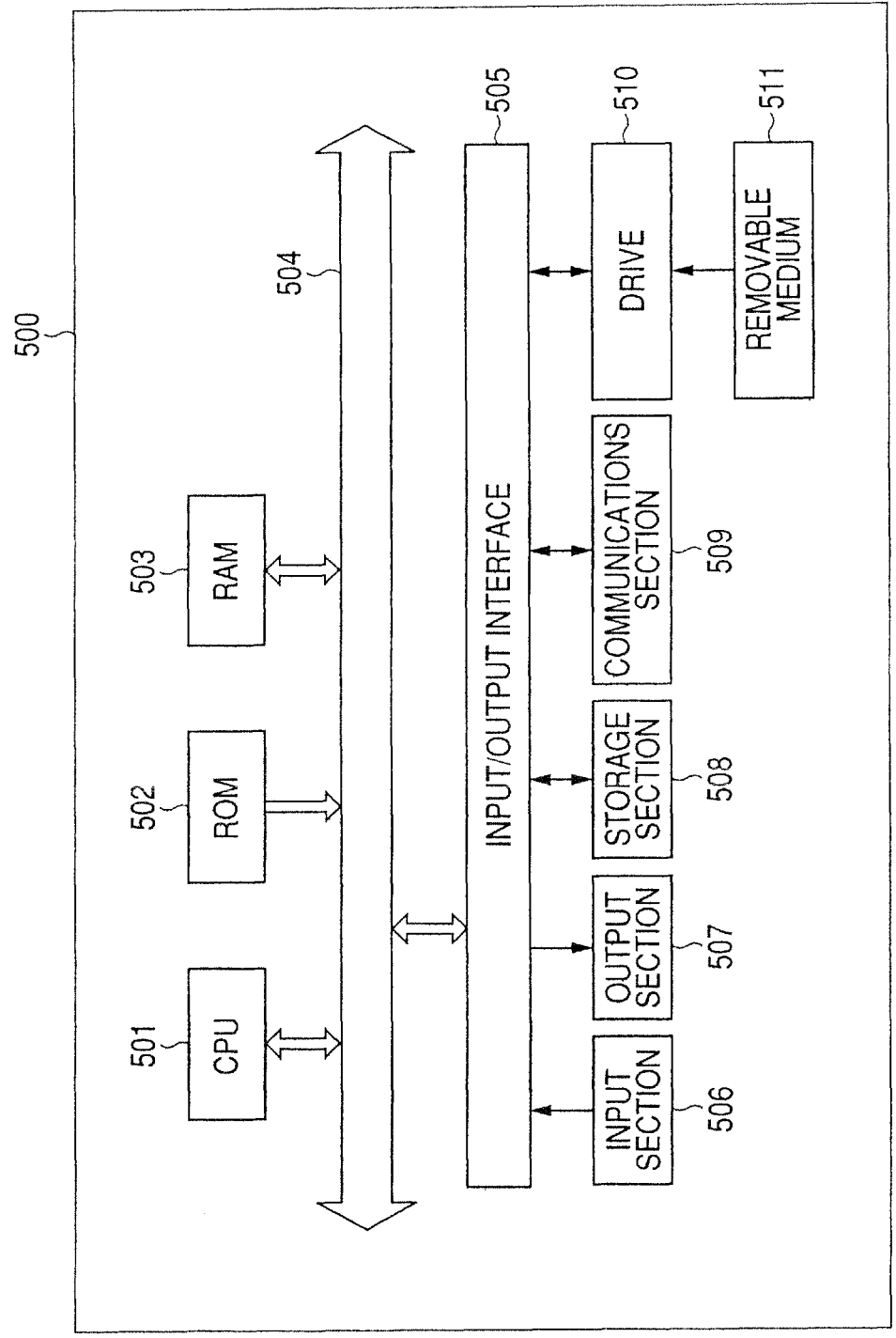
FIG. 25 is a block diagram showing an exemplary configuration of a personal computer.

FIG. 25 is a block diagram showing an exemplary configuration of a personal computer 500 in which the sequence of processes is executed by a program. In the personal computer 500, a CPU (Central Processing Unit) 501 executes various types of processes by following a program stored in a ROM (Read Only Memory) 502 or a storage section 508. A RAM (Random Access Memory) 503 stores therein program, data, and others for execution by the CPU 501 as appropriate. These components, i.e., the CPU 501, the ROM 502, and the RAM 503, are connected together over a bus 504.

The CPU 501 is connected with an input/output interface 505 over the bus 504. The input/output interface 505 is connected with an input section 506 and an output section 507. The input section 506 is configured by a keyboard, a mouse, a microphone, and others, and the output section 507 is configured by a display, a speaker, and others. The CPU 501 executes various types of processes in accordance with a command coming from the input section 506. The CPU 501 then forwards the process result to the output section 507.

The storage section 508 connected to the input/output interface 505 is exemplified by a hard disk, and stores therein programs to be executed by the CPU 501 and various types of data. A communications section 509 communicates with any external device over a network such as the Internet and a local area network.

Alternatively, programs may be acquired over the communications section 509, and stored in the storage section 508.

A drive 510 connected to the input/output interface 505 drives a removable medium 511 when it is attached, and acquires programs and data recorded thereon. The removable medium 511 is exemplified by a magnetic disk, an optical disk, a magneto-optical disk, or a semiconductor memory. The acquired programs and data are transferred to the storage section 508 as required, and then stored.

A program recording medium for use to store a program to be installed to a computer to be ready to run by the computer is configured by, as shown in FIG. 25, the removable medium 511, the ROM 502, a hard disk configuring the storage section 508, and others. The removable medium 511 is a package medium being a magnetic disk (including flexible disk), an optical disk (including CD-ROM (Compact Disc-Read Only Memory), DVD (Digital Versatile Disc)), and a magneto-optical disc, or a semiconductor memory, for example. The ROM 502 stores therein a program temporarily or permanently. The storage of a program to such a program recording medium is made utilizing a cable or radio communications medium via the communications section 509 if required. The communications medium includes a local area network, the Internet, digital satellite broadcasting, and others, and the communications section 509 is an interface such as rooter or modem.

In this specification, the step description for a program stored in a program recording medium includes not only time-series processes to be executed in the described order but also processes to be executed not necessarily in a time series manner but in a parallel manner or separately.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
   a genre word table having a plurality of genres and a plurality of genre feature words indicating features of the plurality of genres, wherein each genre is associated with a predetermined group of genre feature words; and
   one or more processor configured to
   extract genre feature words from program information of a plurality of programs included in a predetermined broadcast period of a channel, and classifying the extracted genre feature words based on programs and genres, the genre feature words being extracted at least from a program title, the name of a channel, and a program summary included in the program information of programs on channels available for selection during a predetermined time period;
   identify the channel by genre based on the genre feature words extracted from the program information;
   acquire a command from a remote controller that indicates an operation of a program by a user;
   assign a value to a respective genre feature word based on an operation history of a program whose program information is used to extract that respective genre feature word and calculating a total value of all genre feature words extracted from a respective channel as a user's degree of preference of the respective channel,
   wherein the operation history of a program includes displaying, recording, dubbing and erasing of the program, and a higher value is assigned to a genre feature word extracted from a displayed program than an erased program;
   the one or more processors being further configured to display channels corresponding to the plurality of genres.

2. The information processing device according to claim 1, wherein the one or more processors are configured to identify the channel by genre based on a counting result of the extracted genre feature word for each of a plurality of genres.

3. The information processing device according to claim 1, wherein the one or more processors are configured to identify the program by genre based on the genre feature word extracted from the program information for the program, and based on the genre of the program to be broadcast on the channel, identifies the channel by genre.

4. The information processing device according to claim 3, wherein the one or more processors are configured to identify the channel by genre based on a counting result of the program to be broadcast on the channel for each of a plurality of genres.

5. The information processing device according to claim 3, wherein the one or more processors are configured to identify the channel by genre based on a counting result of a broadcast time of the program to be broadcast on the channel for each of a plurality of genres.

6. The information processing device according to claim 1, wherein the one or more processors are configured to identify the channel by genre on a basis of the program based on the extracted genre feature word, and the display control means exercises control over the channel to be displayed after classification of a program currently being on the air into any of the genres.

7. The information processing device according to claim 1, wherein the one or more processors are configured to display a genre list, and exercises control over the channel to be displayed in a list for any one of a plurality of genres selected from the genre list.

8. The information processing device according to claim 1, wherein the one or more processors are configured to exercise control over the channel, when the degree of preference is high, to be displayed as a channel belonging to a group different from a plurality of genres.

9. An information processing method, comprising:
   providing a genre word table having a plurality of genres and a plurality of genre feature words indicating features of the plurality of genres, wherein each genre is associated with a predetermined group of genre feature words;
   extracting genre feature words from program information of a plurality of programs included in a predetermined broadcast period of a channel, and classifying the extracted genre feature words based on programs and genres;

identifying the channel by genre based on the genre feature words extracted from the program information;

acquiring a command from a remote controller that indicates an operation of a program by a user;

assigning a value to a respective genre feature word based on an operation history of a program whose program information is used to extract that respective genre feature word and calculating a total value of all genre feature words extracted from a respective channel as a user's degree of preference of the respective channel, wherein the operation history of a program includes displaying, recording, dubbing and erasing of the program, and the calculating step assigns a higher value to a genre feature word extracted from a displayed program than an erased program; and displaying channels corresponding to the plurality of genres, wherein the extracting step extracts genre feature words at least from a program title, the name of a channel, and a program summary included in the program information of every program available for selection during a predetermined time period.

10. A non-transitory computer readable medium having recorded thereon a program operable to instruct a computer to execute a process, comprising:

providing a genre word table having a plurality of genres and a plurality of genre feature words indicating features of the plurality of genres, wherein each genre is associated with a predetermined group of genre feature words;

extracting genre feature words from program information of a plurality of programs included in a predetermined broadcast period of a channel, and classifying the extracted genre feature words based on programs and genres;

identifying the channel by genre based on the genre feature words extracted from the program information;

acquiring a command from a remote controller that indicates an operation of a program by a user;

assigning a value to a respective genre feature word based on an operation history of a program whose program information is used to extract that respective genre feature word and calculating a total value of all genre feature words extracted from a respective channel as a user's degree of preference of that respective channel, wherein the operation history of a program includes displaying, recording, dubbing and erasing of the program, and the calculating step assigns a higher value to a genre feature word extracted from a displayed program than an erased program; and displaying channels corresponding to the plurality of genres, wherein the extracting step extracts genre feature words at least from a program title, the name of a channel, and a program summary included in the program information of every program available for selection during a predetermined time period.

11. An information processing device, comprising:

a genre word table having a plurality of genres and a plurality of genre feature words indicating features of the plurality of genres, wherein each genre is associated with a predetermined group of genre feature words;

an extraction unit that extracts genre feature words from program information of a plurality of programs included in a predetermined broadcast period of a channel, and classifies the extracted genre feature words based on programs and genres;

an identification unit that identifies the channel by genre based on the genre feature words extracted from the program information;

a command acquiring unit that acquires a command from a remote controller that indicates an operation of a program by a user;

a calculation unit that assigns a value to a respective genre feature word based on an operation history of a program whose program information is used to extract that respective genre feature word and calculates a total value of all genre feature words extracted from a respective channel as a user's degree of preference of the respective channel, wherein the operation history of a program includes displaying, recording, dubbing and erasing of the program, and the calculation unit assigns a higher value to a genre feature word extracted from a displayed program than an erased program; and a display control unit that displays channels corresponding to the plurality of genres, wherein the extraction unit extracts genre feature words at least from a program title, the name of a channel, and a program summary included in the program information of programs on channels available for selection during a predetermined time period.

* * * * *